(12) United States Patent
Kitayama (10) Patent No.: US 11,139,705 B2
(45) Date of Patent: Oct. 5, 2021

(54) ELECTRIC MOTOR

(71) Applicant: TOYOTA JIDOSHA KABUSHIKI KAISHA, Toyota (JP)

(72) Inventor: Takeshi Kitayama, Suntou-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 135 days.

(21) Appl. No.: 16/587,987

(22) Filed: Sep. 30, 2019

(65) Prior Publication Data
US 2020/0119605 A1    Apr. 16, 2020

(30) Foreign Application Priority Data
Oct. 16, 2018  (JP) .............................. JP2018-195331

(51) Int. Cl.
*H02K 1/27*     (2006.01)

(52) U.S. Cl.
CPC .................................. *H02K 1/2766* (2013.01)

(58) Field of Classification Search
CPC .... H02K 1/2766; H02K 1/2746; H02K 1/276; H02K 1/2706; H02K 1/278; H02K 1/27–1/2793
USPC ......................................... 310/156.01–156.84
See application file for complete search history.

(56) References Cited

U.S. PATENT DOCUMENTS

| | | | |
|---|---|---|---|
| 2011/0043065 A1* | 2/2011 | Piercey | H02K 15/03 310/156.12 |
| 2011/0193439 A1* | 8/2011 | Yabe | H02K 1/2766 310/156.38 |

FOREIGN PATENT DOCUMENTS

| | | |
|---|---|---|
| JP | 2004-096925 A | 3/2004 |
| JP | 2004-364369 A | 12/2004 |
| JP | 2015204734 A | * 11/2015 |

OTHER PUBLICATIONS

Machine Translation, Kanehara, JP-2015204734-A, Nov. 2015. (Year: 2015).*

* cited by examiner

*Primary Examiner* — Thomas Truong
(74) *Attorney, Agent, or Firm* — Oliff PLC (57) ABSTRACT

An electric motor includes: a stator; and a rotor, in which the rotor includes: a rotor core having magnet insertion holes; and magnets in the magnet insertion holes. Further, the rotor core includes: a rotor core main body; rotor core outer peripheral portions positioned outward in the rotor radial direction with respect to the magnets and forming parts of inner surfaces of the magnet insertion holes outward in the rotor radial direction; and bridges, forming the respective magnet insertion holes by connecting the rotor core main body and the rotor core outer peripheral portions, the bridges being formed to be thinner than thickest portions of the rotor core outer peripheral portions, and the magnets are shaped to be a cross-section polyhedron having oblique sides which narrow as the oblique sides go from the inward toward the outward in the rotor radial direction.

7 Claims, 10 Drawing Sheets

ELECTRIC MOTOR

CROSS-REFERENCE TO RELATED APPLICATION(S)

The present application claims priority to and incorporates by reference the entire contents of Japanese Patent Application No. 2018-195331 filed in Japan on Oct. 16, 2018.

BACKGROUND

The present disclosure relates to an electric motor.

In Japanese Laid-open Patent Publication No. 2004-364369, there is disclosed an electric motor in which, in a plan view in which a rotor is viewed from the axial direction, a trapezoidal magnet having a pair of oblique sides inclined such that the distance therebetween narrows as it goes from the inner side toward the outer side in the rotor radial direction is embedded in a rotor core.

SUMMARY

There is a need for providing an electric motor capable of suppressing stress concentration on a rotor core due to centrifugal force applied to a magnet and reducing a leakage flux.

According to an embodiment, an electric motor includes: a stator; and a rotor rotatably provided with respect to the stator. Further, the rotor includes: a rotor core having a plurality of magnet insertion holes formed in a rotor circumferential direction; and a plurality of magnets respectively provided in the magnet insertion holes, the rotor core includes: a rotor core main body forming at least inner surfaces of the magnet insertion holes inward in a rotor radial direction; a plurality of rotor core outer peripheral portions positioned outward in the rotor radial direction with respect to the respective magnets and forming parts of inner surfaces of the magnet insertion holes outward in the rotor radial direction; and a plurality pairs of bridges, forming the respective magnet insertion holes together with the rotor core main body and the rotor core outer peripheral portions by connecting the rotor core main body and the rotor core outer peripheral portions, the bridges being formed to be thinner than thickest portions of the rotor core outer peripheral portions in a plan view in which the rotor is viewed from an axial direction, and the magnets are shaped to be a cross-section polyhedron having a pair of oblique sides inclined such that a distance between the oblique sides narrows as the oblique sides go from the inward toward the outward in the rotor radial direction in the plan view in which the rotor is viewed from the axial direction.

DETAILED DESCRIPTION

In the electric motor disclosed in Japanese Laid-open Patent Publication No. 2004-364369, there has been still room for consideration in reducing, among magnetic fluxes from the trapezoidal magnet, a leakage flux that is a flux not directed to a stator disposed outward in the rotor radial direction, and in stress concentration on the rotor core due to centrifugal force applied to the magnet when the rotor rotates.

Hereinafter, an embodiment of an electric motor according to the present disclosure will be described. Note that the present disclosure is not limited by the present embodiment.

Figure 1:
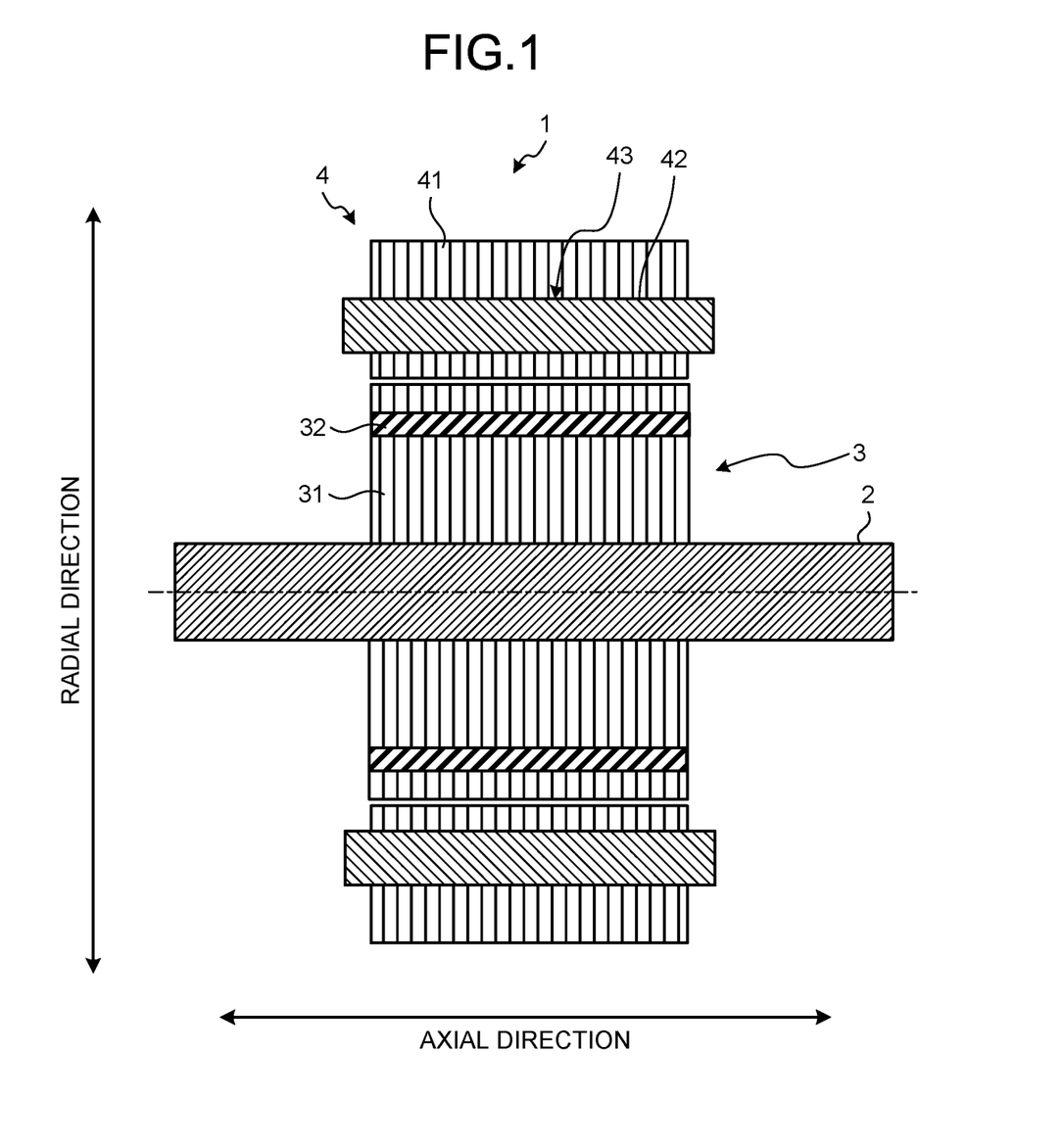
FIG. 1 is a cross-sectional view of an electric motor according to an embodiment.
Figure 2:
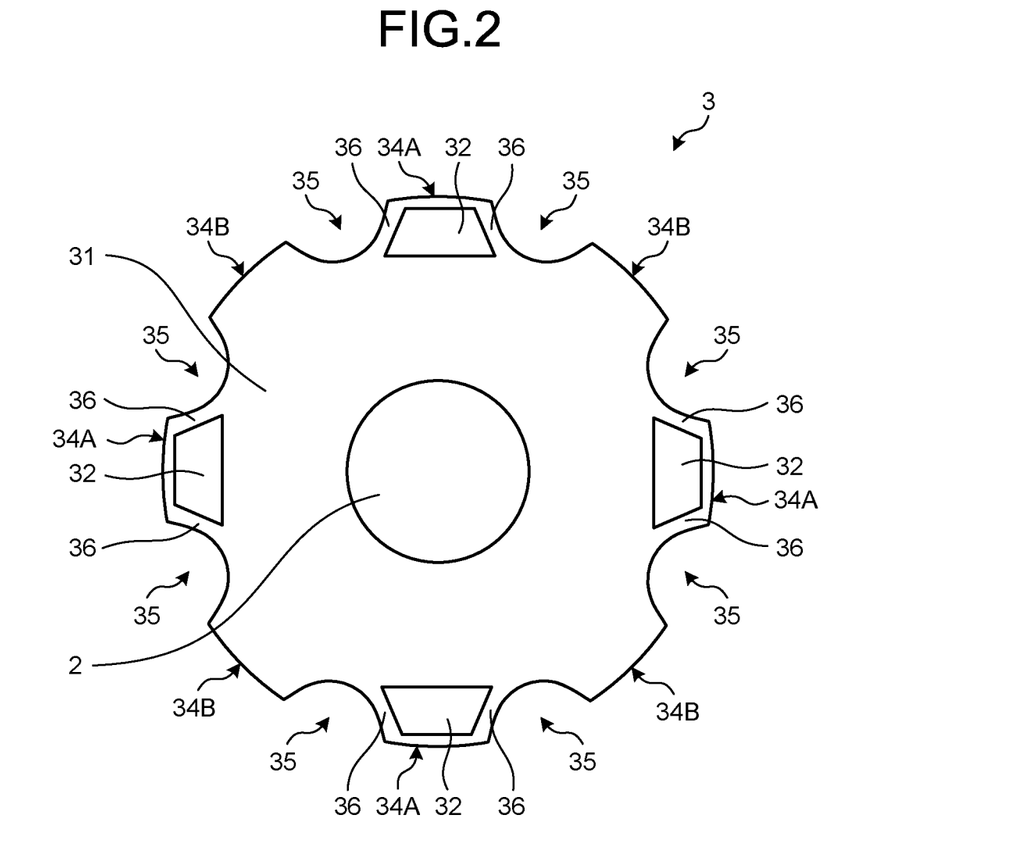
FIG. 2 is a view of a rotor viewed from the axial direction thereof.

FIG. 1 is a cross-sectional view of an electric motor 1 according to the embodiment. FIG. 2 is a view of a rotor 3 as viewed from the axial direction. As illustrated in FIG. 1, the electric motor 1 according to the embodiment includes a shaft 2, the rotor 3, a stator 4 and the like.

The shaft 2 is a metallic rotary shaft member elongated in the axial direction. Note that the term "axial direction" in the descriptions is defined to be the axial direction (longitudinal direction) of the shaft 2. The rotor 3 includes a rotor core 31, a magnet 32 and the like. The rotor core 31 is formed in a cylindrical shape by laminating a plurality of electromagnetic steel sheets in the axial direction of the shaft 2. In the rotor core 31, there is a gap between the electromagnetic steel sheets in the axial direction, whereby the magnetoresistance in the axial direction is greater than the magnetoresistance in the circumferential direction and the radial direction that is a direction orthogonal to the axial direction of the rotor core 31. Therefore, in the rotor core 31, a magnetic flux hardly flows in the axial direction, and the magnetic flux easily flows in the radial direction and the circumferential direction. The magnet 32 is embedded in the rotor core 31, and extends in the axial direction of the rotor core 31. Both axial end surfaces of the magnet 32 are substantially flush with both axial end surfaces of the rotor core 31.

The stator 4 is disposed at a predetermined interval radially outward of the rotor, and includes an annular stator core 41 in which a plurality of slots 43 is formed in the circumferential direction, and a stator coil 42 inserted into each slot 43 and wound around the stator core 41. The stator core 41 is formed by laminating a plurality of electromagnetic steel sheets in the axial direction.

The rotor core 31 has a plurality of magnet insertion holes 33 disposed at regular intervals along the rotor circumferential direction, which is formed in a trapezoidal shape with a direction orthogonal to the rotor radial direction serving as a longitudinal direction when the rotor 3 is viewed from the axial direction, and is formed to axially penetrate. Note that the rotor 3 of FIG. 2 has four magnet insertion holes 33 provided at every 90 degrees in the rotor circumferential direction.

The rotor core 31 includes a rotor core main body 31a forming at least an inner surface 33a of the magnet insertion hole 33 inward in the rotor radial direction, a rotor core outer peripheral portion 31b positioned outward in the rotor radial direction with respect to the magnet 32 and forming a part of an inner surface 33b of the magnet insertion hole 33 outward in the rotor radial direction, and a bridge 36 forming the magnet insertion hole 33 together with the rotor core main body 31a and the rotor core outer peripheral portion 31b by connecting the rotor core main body 31a and the rotor core outer peripheral portion 31b.

In addition, the rotor core 31 has a plurality of gaps 35 disposed in the rotor circumferential direction, which is formed in a substantially U-shape opened outward in the rotor radial direction when the rotor 3 is viewed in the axial direction, and axially penetrates. The gap 35 and the bridge 36 are adjacent to each other in the rotor circumferential direction.

The magnet 32 is, for example, a neodymium magnet. In the present embodiment, the magnet 32 is shaped to be a cross-section polyhedron having a pair of oblique sides inclined such that the distance therebetween narrows as it goes from the inner side toward the outer side in the rotor radial direction in a plan view in which the rotor 3 is viewed from the axial direction. Specifically, the cross-section polyhedron is a symmetric trapezoid surrounded by four sides including a short side 321 and a long side 323 orthogonal to the rotor radial direction, and a pair of oblique sides 322 inclined such that the distance therebetween narrows as it goes from the inner side toward the outer side in the rotor radial direction. In the plan view in which the rotor 3 is viewed from the axial direction as described above, the trapezoidal magnet 32 is inserted into the trapezoidal magnet insertion hole 33. When the magnet 32 is inserted into the magnet insertion hole 33, there is a slight gap between the outer periphery of the magnet 32 and the inner periphery of the magnet insertion hole 33, and the gap is filled with resin to be hardened so that the magnet 32 is fixed in the magnet insertion hole 33. Alternatively, the magnet 32 may be press-fitted and fixed in the magnet insertion hole 33.

In this manner, a plurality of magnets 32 is embedded in the rotor core 31 in the rotor circumferential direction, and the rotor 3 is what is called an interior permanent magnet (IPM) rotor (magnet-embedded rotor). Further, in the rotor 3 illustrated in FIG. 2, a portion in which the magnet 32 is disposed to be sandwiched between the pair of gaps 35 in the rotor circumferential direction is set to be a magnetic pole portion 34A. Furthermore, in the rotor 3 illustrated in FIG. 2, a portion adjacent to the magnetic pole portion 34A with the gap 35 interposed therebetween in the rotor circumferential direction is set to be a pseudo magnetic pole portion 34B in which no magnet 32 is disposed. Each of the magnets 32 is set to the same magnetic pole (e.g., N pole), and the magnetism of the magnet 32 causes the pseudo magnetic pole portion 34B to function as a magnetic pole different from that of the magnetic pole portion 34A (e.g., S pole). Accordingly, in the rotor 3 of FIG. 2, the magnetic pole portion 34A and the pseudo magnetic pole portion 34B having mutually different magnetic poles are alternately arranged in the rotor circumferential direction. In this manner, the rotor 3 of FIG. 2 is what is called a consequent-pole rotor.

The bridge 36 is formed to be thinner than the thickest portion of the rotor core outer peripheral portion 31b in the plan view in which the rotor 3 is viewed in the axial direction. Specifically, it is formed such that a side surface 361 on the side of the gap 35 of the bridge 36 is recessed toward the side of the magnet 32 in the rotor circumferential direction. Meanwhile, in the rotor circumferential direction, an inner surface 33c (side surface on the side of the magnet 32 of the bridge 36) of the magnet insertion hole 33 formed by the bridge 36 in the rotor circumferential direction is formed along the oblique side 322 of the magnet 32 facing the inner surface 33c. Accordingly, the width of the bridge 36 in the rotor circumferential direction can be made narrower than in the case where the side surface 361 on the side of the gap 35 of the bridge 36 is not formed to be recessed toward the side of the magnet 32. As a result, since the width of the bridge 36 can be narrowed, among magnetic fluxes MF from the magnet 32 of FIG. 3, a leakage flux LF that is a magnetic flux passing through the bridge 36 without being directed toward the side of the stator 4 can be reduced.

Figure 3:
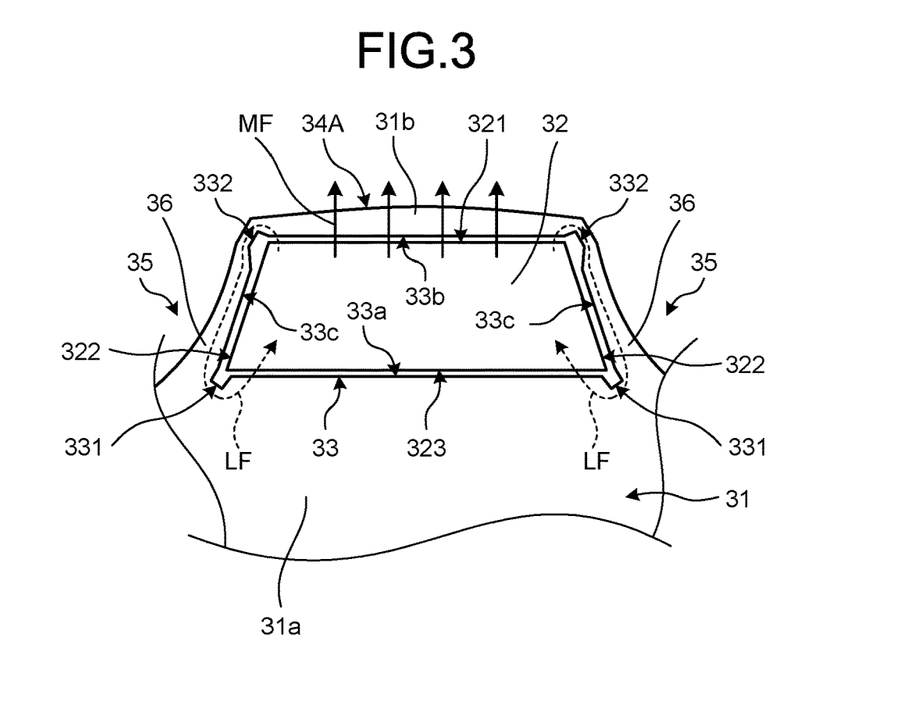
FIG. 3 is an enlarged view of a magnet of the rotor and an vicinity thereof.

Here, the shape of the magnet 32 is a trapezoid in the plan view in which the rotor 3 is viewed from the axial direction, whereby the rotor core 31 is pressed by the pair of oblique sides 322 and the short side 321 of the magnet 32 due to centrifugal force F in the radial direction generated by the rotor 3 being rotated. At this time, the force with which the magnet 32 presses the rotor core 31 due to the centrifugal force F is dispersed to the short side 321 and the pair of oblique sides 322, whereby stress concentration on the rotor core 31 due to the centrifugal force F applied to the magnet 32 can be suppressed.

Further, on the oblique side 322 of the magnet 32, a component of the centrifugal force F is divided into a component force Fa in a direction orthogonal to the oblique side 322 and a component force Fb in a direction parallel to the oblique side 322. Accordingly, the force applied from the oblique side 322 of the magnet 32 to the bridge 36 due to the centrifugal force F becomes the component force Fa smaller than the centrifugal force F. Therefore, bending stress hardly acts on the bridge 36 even if the width of the bridge 36 is narrowed as described above, whereby deformation of the bridge 36 can be suppressed.

Furthermore, in the present embodiment, there are provided core clearance shape portions 331 and 332 that are axially penetrating through holes connected to the magnet insertion hole 33 at positions of the rotor core 31 facing the corners of the magnet 32 in the plan view in which the rotor 3 is viewed from the axial direction. Specifically, the core clearance shape portion 331 is provided at a portion facing the corner formed by the oblique side 322 and the long side 323 of the magnet 32 in the rotor core 31. Furthermore, the core clearance shape portion 332 is provided at a portion facing the corner formed by the oblique side 322 and the short side 321 of the magnet 32 in the rotor core 31 in the plan view in which the rotor 3 is viewed from the axial direction. In this manner, the core clearance shape portions 331 and 332 are formed at the portions facing the corners of the magnet 32 in the rotor core 31, whereby the stress concentration from each corner of the magnet 32 to the rotor core 31 can be suppressed.

Figure 4:
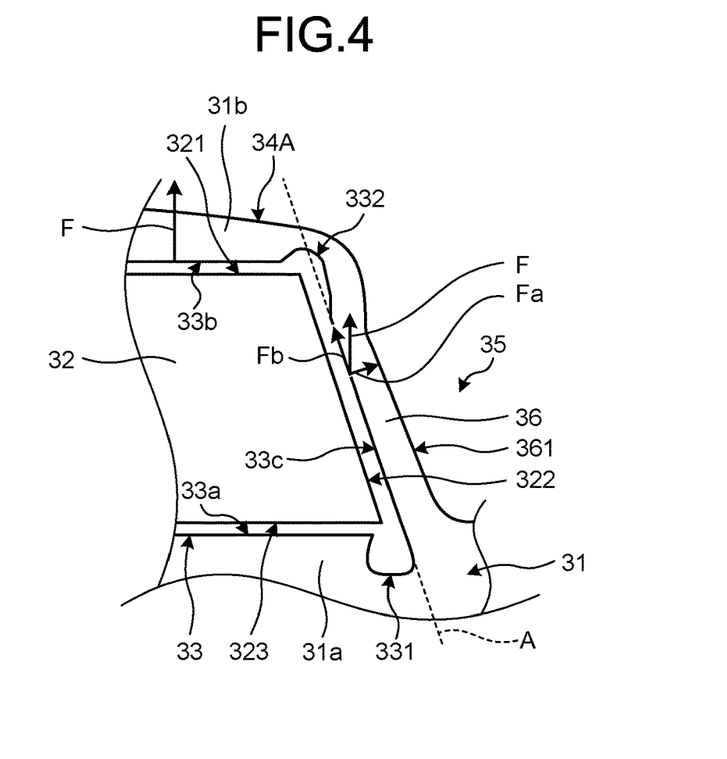
FIG. 4 is an enlarged view of a half side of the magnet in the rotor circumferential direction thereof.

Furthermore, in the plan view in which the rotor 3 is viewed from the axial direction, the core clearance shape portion 331 is positioned at the corner formed by the inner surface 33c of the magnet insertion hole 33 formed by the bridge 36 in the rotor circumferential direction and the inner surface 33a of the magnet insertion hole 33 formed by the rotor core main body 31a inward in the rotor radial direction. In addition, as illustrated in FIG. 4, the core clearance shape portion 331 is formed closer to the side of the magnet 32 than a straight line A passing on the inner surface 33c of the magnet insertion hole 33 in the rotor circumferential direction in the plan view in which the rotor 3 is viewed from the axial direction.

Figure 5:
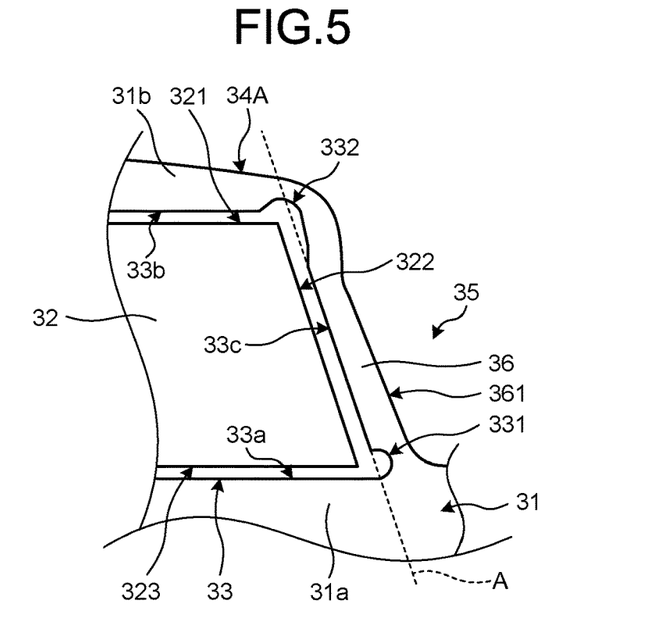
FIG. 5 is a view illustrating a case where a core clearance shape portion positioned on the inner peripheral side of a rotor core is formed on the side opposite to the side of the magnet with respect to a straight line passing on the end face of a magnet insertion hole in the longitudinal direction thereof.

For example, as illustrated in FIG. 5, when the core clearance shape portion 331 is formed only on the side opposite to the side of the magnet 32 with respect to the straight line A in the plan view in which the rotor 3 is viewed from the axial direction, stress is concentrated in the direction in which the bridge 36 opens (direction away from the magnet 32) due to the centrifugal force, which may lead to deformation of the bridge 36. In view of the above, as illustrated in FIG. 4, the core clearance shape portion 331 is formed on the side closer to the magnet 32 than the straight line A, whereby the stress concentration in the direction in which the bridge 36 opens (direction away from the magnet 32) due to the centrifugal force can be suppressed.

Figure 6:
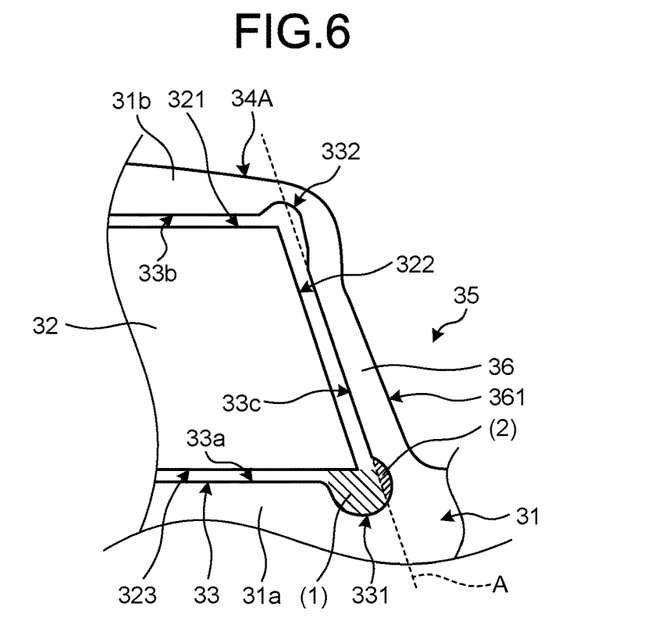
FIG. 6 is an explanatory view of a ratio of an area of the core clearance shape portion positioned on the inner peripheral side of the rotor core.

In the present embodiment, the shape of the core clearance shape portion 331, which is for suppressing the stress concentration in the direction in which the bridge 36 opens (direction away from the oblique side 322 of the magnet 32) due to the centrifugal force, is not limited to the one formed only on the side of the magnet 32 with respect to the straight line A. That is, as illustrated in FIG. 6, the core clearance shape portion 331 only needs to be formed such that an area (1) on the side of the magnet 32 with respect to the straight line A is greater than an area (2) on the side opposite to the side of the magnet 32 with respect to the straight line A.

In addition, a configuration of the rotor 3 included in the electric motor 1 according to the embodiment is not limited to the consequent-pole rotor of FIG. 2. For example, the magnet 32 may also be disposed in the pseudo magnetic pole portion 34B of the rotor 3 illustrated in FIG. 2, and the rotor 3 may be configured such that the magnetic pole portions 34A are adjacently arranged with the gap 35 interposed therebetween in the rotor circumferential direction of FIG. 7.

Figure 7:
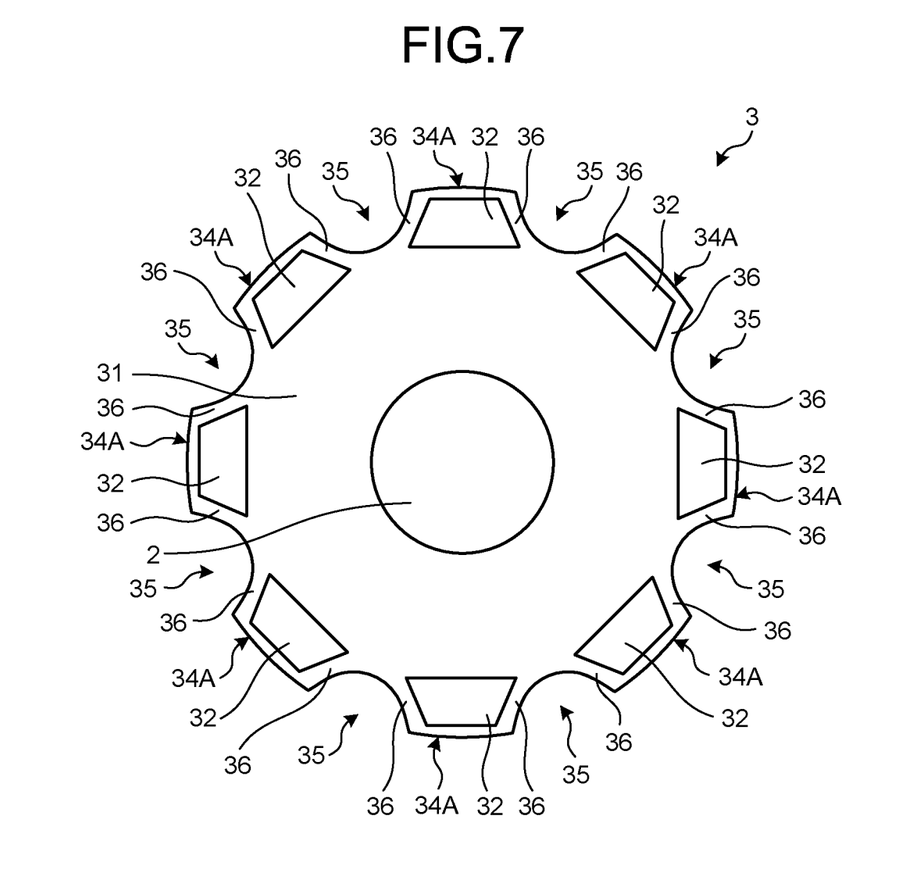
FIG. 7 is a view of the rotor, viewed from the axial direction, in which magnetic pole portions thereof are arranged with a gap interposed therebetween in the rotor circumferential direction.
Figure 8:
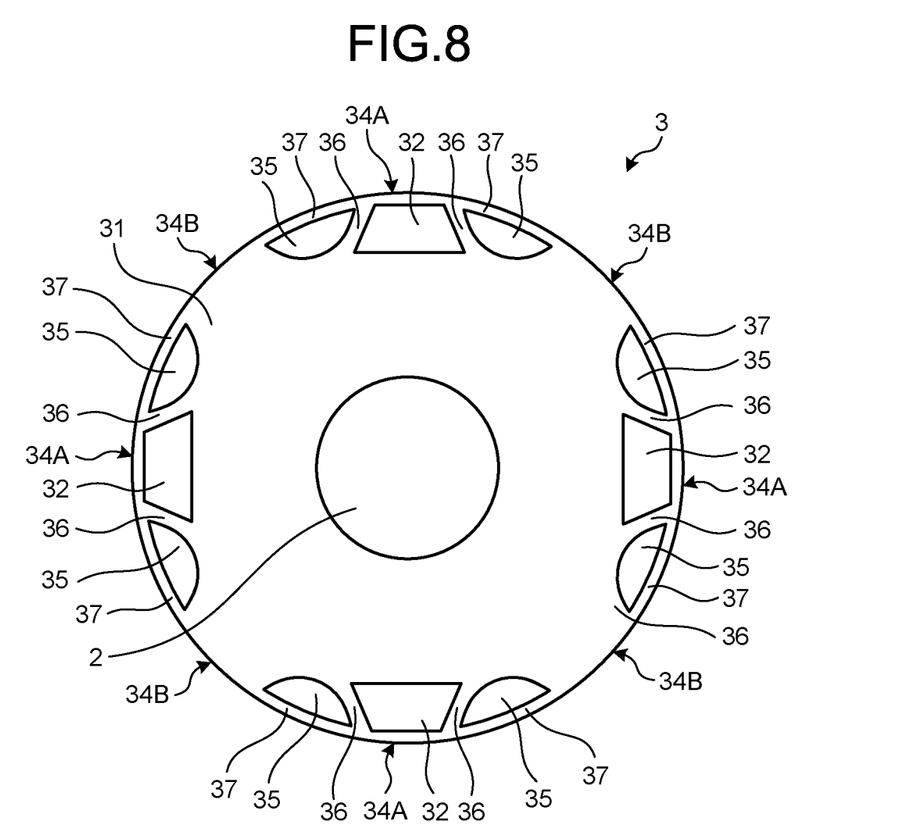
FIG. 8 is a view of the rotor, viewed from the axial direction, of FIG. 2 in the case where outer peripheries of adjacent magnetic pole portions and pseudo magnetic pole portions are connected by bridges.
Figure 9:
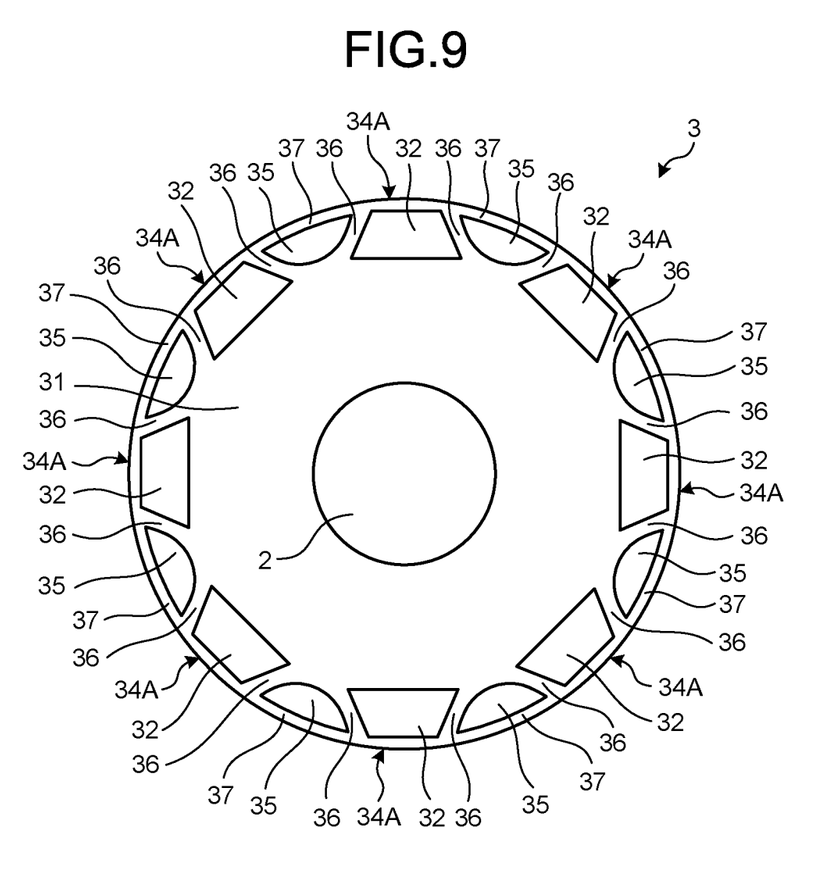
FIG. 9 is a view of the rotor, viewed from the axial direction, of FIG. 7 in the case where outer peripheries of adjacent magnetic pole portions are connected by bridges.

Furthermore, the rotor 3 included in the electric motor 1 according to the present embodiment may have a configuration in which the rotor core outer peripheral portion 31b (outer periphery of the rotor core 31) is annular such that the outer peripheries of the magnetic pole portion 34A and the pseudo magnetic pole portion 34B adjacent to each other are connected by a bridge 37 of FIG. 8 in the rotor 3 illustrated in FIG. 2, or the outer peripheries of the adjacent magnetic pole portions 34A are connected by the bridge 37 of FIG. 9 in the rotor 3 illustrated in FIG. 7. Accordingly, wind noise that may be generated when the rotor rotates can be reduced. The rotor 3 of FIGS. 2 and 8 is of the consequent-pole type, whereby the number of the magnets 32 provided in the rotor core 31 can be reduced compared with the rotor 3 of FIGS. 7 and 9. Since the number of the magnets 32 can be reduced, portions of the rotor core 31 pressed by the plurality of magnets 32 due to the centrifugal force is reduced, whereby durability of the rotor core 31 can be improved.

Figure 10:
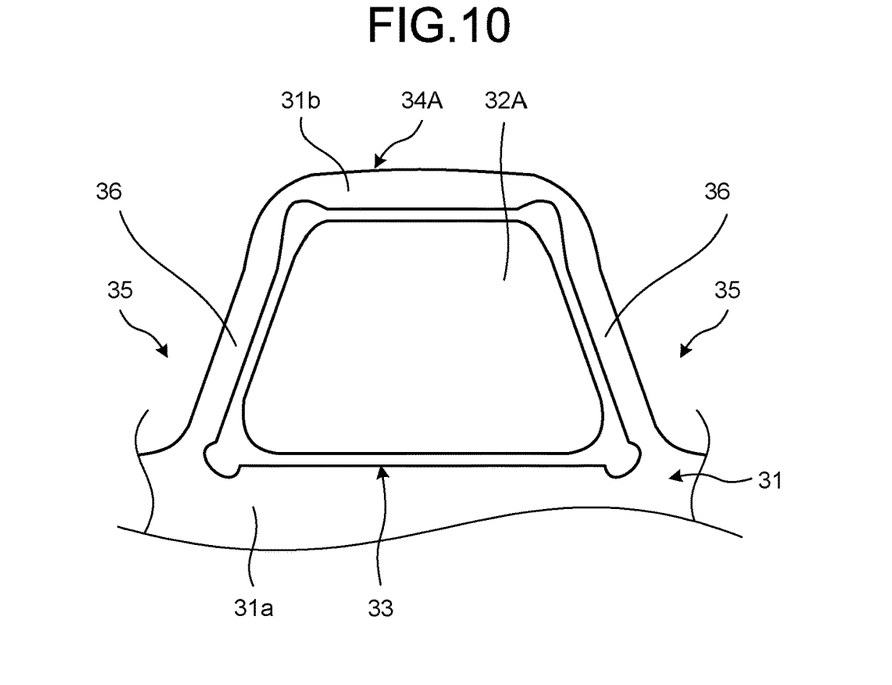
FIG. 10 is a view illustrating a case where four corners of a trapezoidal magnet are rounded in a plan view in which the rotor is viewed from the axial direction.

Moreover, in the present embodiment, at least one corner of the magnet 32 may be rounded (R-shaped). For example, as illustrated in FIG. 10, four corners of a trapezoidal magnet 32A may be rounded (R-shaped) in the plan view in which the rotor 3 is viewed from the axial direction. With this arrangement, stress concentration in the portion facing each corner of the magnet 32 in the rotor core 31 can be suppressed.

Figure 11:
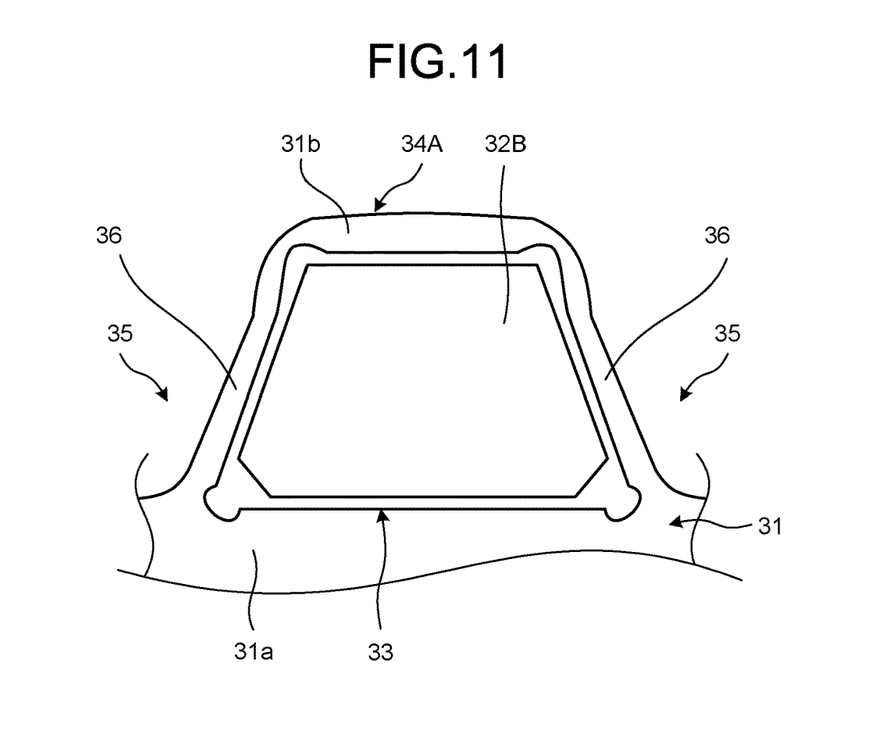
FIG. 11 is a view illustrating a case where a hexagonal magnet is used as a cross-section polyhedron.
Figure 12:
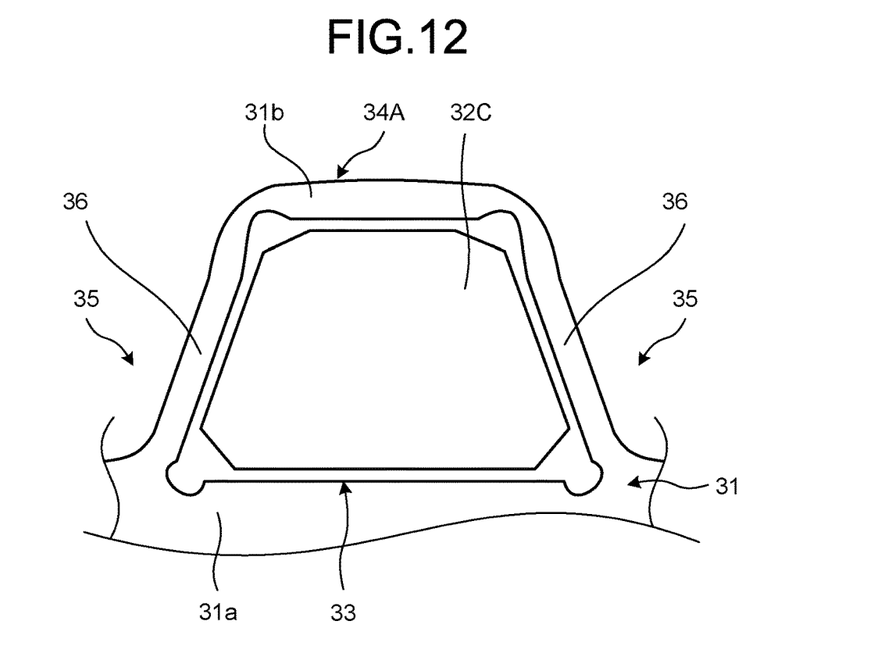
FIG. 12 is a view illustrating a case where an octagonal magnet is used as a cross-section polyhedron.
Figure 13:
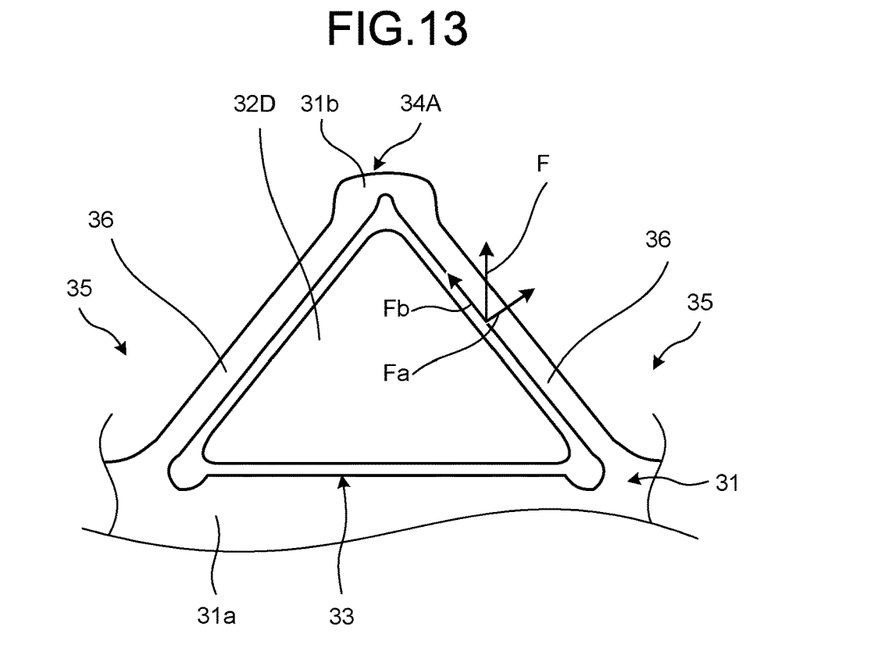
FIG. 13 is a view illustrating a case where a triangular magnet is used as a cross-section polyhedron.
Figure 14:
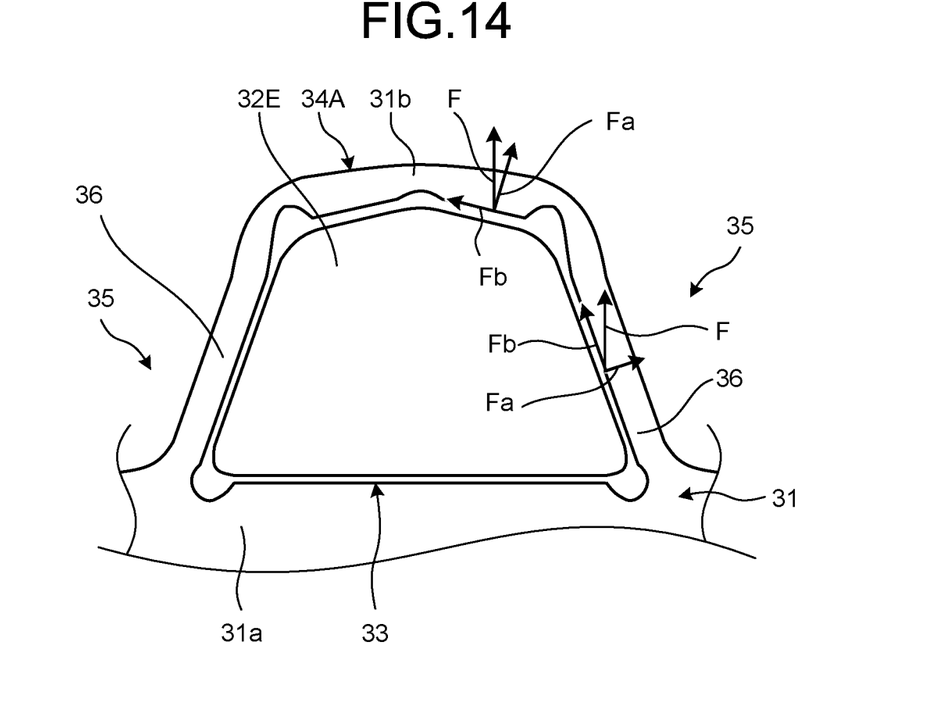
FIG. 14 is a view illustrating a case where a pentagonal magnet is used as a cross-section polyhedron.

Moreover, in the present embodiment, a shape of the magnet 32 that is a cross-section polyhedron in the plan view in which the rotor 3 is viewed from the axial direction may be a hexagonal magnet 32B of FIG. 11, an octagonal magnet 32C of FIG. 12, a triangular magnet 32D of FIG. 13, or may be a pentagonal magnet 32E of FIG. 14. Although each corner of the magnet 32 having the hexagonal shape of FIG. 11 or the octagonal shape of FIG. 12 is sharp (angular shape), it may be rounded (R-shaped). In addition, although each corner of the magnet 32 having the triangular shape of FIG. 13 or the pentagonal shape of FIG. 14 is rounded (R-shaped), it may be sharp (angular shape). As described above, in any of the shapes of the magnets 32A to 32E of FIGS. 11 to 14, it has a pair of oblique sides inclined such that the distance therebetween narrows as it goes from the inward toward the outward in the rotor radial direction in the plan view in which the rotor 3 is viewed from the axial direction, whereby the stress concentration on the rotor core 31 due to the centrifugal force F can be suppressed. The shape of the magnet insertion hole 33 into which the magnets 32A to 32E of FIGS. 11 to 14 are inserted may be appropriately set according to the shapes of the magnets 32A to 32E.

In the electric motor according to the present disclosure, the force with which the magnet presses the rotor core due to the centrifugal force is dispersed to at least a pair of oblique sides, whereby the stress concentration on the rotor core due to the centrifugal force applied to the magnet can be suppressed, and a leakage flux can be reduced as a width of the bridge can be narrowed.

According to an embodiment, stress concentration in the portion of the rotor core facing the corner of the magnet can be suppressed.

According to an embodiment, stress concentration in the direction in which the bridge opens due to centrifugal force can be suppressed.

According to an embodiment, wind noise that may be generated when the rotor rotates can be reduced.

According to an embodiment, pressing force from the magnet due to the centrifugal force is applied to the rotor core at the short side and the oblique sides of the trapezoid, whereby the stress concentration can be suppressed.

According to an embodiment, stress concentration in the portion of the rotor core facing the corner of the magnet can be suppressed.

According to an embodiment, the number of the magnets provided in the rotor core can be reduced so that portions of the rotor core pressed by the magnets due to the centrifugal force is reduced, whereby durability of the rotor core can be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric motor comprising:
   a stator; and a rotor rotatably provided with respect to the stator, wherein the rotor includes:
- a rotor core having a plurality of magnet insertion holes formed in a rotor circumferential direction; and
- a plurality of magnets respectively provided in the magnet insertion holes, the rotor core includes:
- a rotor core main body forming at least inner surfaces of the magnet insertion holes inward in a rotor radial direction;
- a plurality of rotor core outer peripheral portions positioned outward in the rotor radial direction with respect to the respective magnets and forming parts of inner surfaces of the magnet insertion holes outward in the rotor radial direction; and
- a plurality pairs of bridges, forming the respective magnet insertion holes together with the rotor core main body and the rotor core outer peripheral portions by connecting the rotor core main body and the rotor core outer peripheral portions, the bridges being formed to be thinner than thickest portions of the rotor core outer peripheral portions in a plan view in which the rotor is viewed from an axial direction, and the pairs of bridges being inclined from the rotor core main body to the rotor core outer peripheral portions such that a distance therebetween narrows from an inner side toward an outer side in the rotor radial direction, the magnets are shaped to be a cross-section polyhedron having a pair of oblique sides inclined such that a distance between the oblique sides narrows as the oblique sides go from the inward toward the outward in the rotor radial direction in the plan view in which the rotor is viewed from the axial direction, each of the magnet insertion holes has a shape such that a part of a centrifugal force, which is generated when the rotor is rotated, in the rotor radial direction is directly applied from the pair of oblique sides to the bridges, and the cross-section polyhedron is a symmetric trapezoid surrounded by four sides including a first side and a second side orthogonal to the rotor radial direction, and the pair of oblique sides being inclined from the second side to the first side such that a distance therebetween narrows from an inner side toward an outer side in the rotor radial direction at a same incline at which the pairs of bridges are inclined.

2. The electric motor according to claim 1, wherein the rotor has a plurality of axially penetrating through holes each connected to the magnet insertion hole at a portion of the rotor core facing a corner of the magnet in the plan view in which the rotor is viewed from the axial direction.

3. The electric motor according to claim 2, wherein
in the plan view in which the rotor is viewed from the axial direction,
each of the through hole is positioned at a corner formed by an inner surface of the magnet insertion hole formed by the bridge in the rotor circumferential direction and the inner surface of the magnet insertion hole formed by the rotor core main body inward in the rotor radial direction, and
in each of the through holes, with respect to a straight line passing on the inner surface of the magnet insertion hole in the rotor circumferential direction, an area on a side of the magnet is greater than an area on a side opposite to the side of the magnet.

4. The electric motor according to claim 2, wherein
in the plan view in which the rotor is viewed from the axial direction,
each of the through holes is positioned at a corner formed by an inner surface of the magnet insertion hole formed by the bridge in the rotor circumferential direction and the inner surface of the magnet insertion hole formed by the rotor core main body inward in the rotor radial direction, and
each of the through holes is provided on a side of the magnet with respect to a straight line passing on the inner surface of the magnet insertion hole in the rotor circumferential direction.

5. The electric motor according to claim 1, wherein the rotor core outer peripheral portions are annular in the rotor circumferential direction.

6. The electric motor according to claim 1, wherein at least one corner of each of the magnets is rounded in the plan view in which the rotor is viewed from the axial direction.

7. The electric motor according to claim 1, wherein the rotor is of a consequent-pole type.

* * * * *